United States Patent [19]

Hendrickson

[11] Patent Number: 4,620,441

[45] Date of Patent: Nov. 4, 1986

[54] LIQUID LEVEL CONTROL

[75] Inventor: David L. Hendrickson, Tulsa, Okla.

[73] Assignee: Custom Engineering & Mfg. Co., Tulsa, Okla.

[21] Appl. No.: 565,046

[22] Filed: Dec. 23, 1983

[51] Int. Cl.⁴ .................... G01F 23/02; G01F 23/30
[52] U.S. Cl. .................................... 73/327; 73/323;
73/331; 137/398; 137/559; 116/276
[58] Field of Search ............... 73/317, 323, 327, 330,
73/331, 334, 324–326, 329; 116/228, 229, 276,
227; 137/101.25, 397, 398, 554; 122/504.2;
220/82 R, 82 A, 82.5

[56] References Cited

U.S. PATENT DOCUMENTS

| 318,284 | 5/1885 | Ochwadt | 73/334 |
| 1,189,922 | 7/1916 | Daly | 73/331 |
| 2,594,113 | 4/1952 | Askin . | |
| 3,089,338 | 5/1963 | Glasgow | 73/331 |
| 3,373,610 | 3/1968 | Stieber | 73/334 |
| 3,686,451 | 8/1972 | Pottharst, Jr. | 200/84 R |
| 3,970,099 | 7/1976 | Murphy, Jr. et al. | 137/101.25 |
| 4,181,021 | 1/1980 | Harris et al. | 73/317 |

Primary Examiner—Charles Frankfort
Assistant Examiner—W. Morris Worth
Attorney, Agent, or Firm—Head, Johnson & Stevenson

[57] ABSTRACT

A liquid level control responsive to the level of liquid in a vessel having visual verification of fluid level including a tubular body for attachment to an opening in a vessel, the body having aligned openings in opposite sides receiving a pivot shaft, a control box mounted on one side and receiving an extension of the pivot shaft, an arm having one end attached to the pivot shaft and extending out the end of the body into the vessel and having a float on the end which is responsive to the level of liquid within the vessel, a control system within the box actuated by rotation of the pivot arm, and a transparent sight glass sealably closing the end of the tubular body so that the operator can observe the liquid level in the vessel through the sight glass.

2 Claims, 3 Drawing Figures

LIQUID LEVEL CONTROL

SUMMARY OF THE INVENTION

An important type of control utilized in industry is that for responding to the level of liquids in a vessel. The most common device of this type includes a float within the vessel which rises and falls in response to the liquid. The liquid level can be measured either as the interface between liquid and air, or between two different liquids of different densities.

A common type of flow control is the pneumatic type in which a source of air pressure is supplied to the control. Another common type is that which actuates an electric switch. The present invention is applicable to either type but will be illustrated as it is particularly used in conjunction with the pneumatic type control device.

There are two basic problems with most presently employed liquid level controls. First the operator must rely entirely on the function of the control as an indication of the level of liquid within the vessel. No other means is usually provided so that the operator can verify that the level of liquid within the vessel is that level which is indicated by the control. The present invention solves this problem by providing a visual verification for the operator of the level of liquid within the vessel.

Another problem which exists with most liquid level controls in use today is that it is difficult to accurately adjust the control to operate at an exact selected level of liquid. These problems are particularly magnified when the vessel functions at high temperatures. If the vessel operates at atmospheric pressure then by removing a top cover an inspection of the level can be made but if the vessel operates at a super-atmospheric pressure it is difficult for the operator to accurately calibrate the control device to actuate at a preselected level.

The present invention solves these problems by providing a liquid level control which affords the operator both a visual verification of the level of liquid within the vessel and a visual indication of the state of the control device. In this manner the operator can much more expeditiously and accurately adjust the level of control.

The invention provides a tubular body having a forward end and a rearward end. The body is affixed to the opening in the vessel at its rearward end. The body has aligned openings on opposite sides adjacent and spaced from the forward end. The co-axis of the openings is perpendicular to the body tubular axis. A control box is mounted on one side of the body. An opening in the control box corresponds with one of the openings in the tubular body. A pivot shaft is sealable and rotatably mounted in the openings in the tubular body and one end of the pivot shaft extend within the control box.

A float arm has one end attached to the pivot shaft within the tubular body and extends transversly of the pivot shaft, the second end of the float arm extending past the body rearward end and into the vessel to which the body is attached. A float is secured to the second end of the float arm and is elevationally responsive to the level of liquid within the vessel so that the float causes the pivot shafts to rotate in response to changes in the liquid level.

Control apparatus, either pneumatic or electric, is positioned within the box. The specific arrangement of the control apparatus is not a portion of the present invention since such apparatus is well known in the industry. The control apparatus functions to provide a signal when the fluid level either rises or falls past a pre-selected level as detected by the float.

A transparent sight glass is employed to sealably close the tubular body forward end. The sight glass provides a visual indication of the fluid level within the vessel since the sight glass is in alignment with the tubular axis.

By employment of the sight glass the operator can visually determine the level of fluid within the vessel particularly when in the range of level which will actuate the float to cause a control function. The operator can easily verify the attitude of the control mechanism within the control box and compare that with the visually determined level of liquid within the vessel to confirm the operation of the control in response to rising and falling liquid levels.

DETAILED DESCRIPTION OF THE PREFERRED EMBODIMENT

Figure 1:
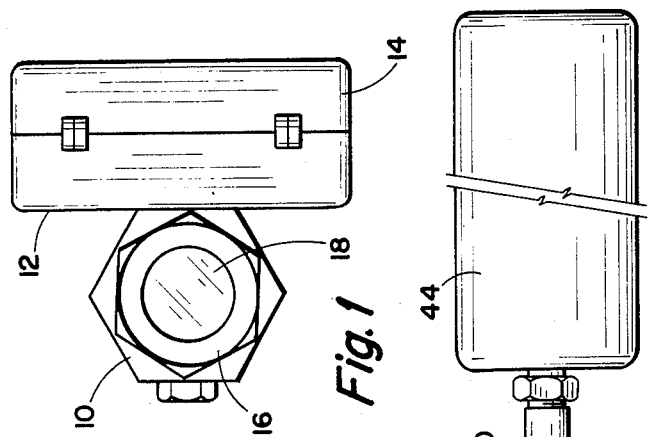
FIG. 1 is an end view, in reduced scale of an embodiment of the invention.

Referring to the drawings and first to FIG. 1 an end view of the invention is shown. A housing 10 supports the other elements of the invention. The housing 10 shown is of hexagonal external cross-sectional configuration although it is understood that it can equally as well be of any other cross-sectional configuration. The housing 10 is tubular, as will be described subsequently. Affixed to the sidewall of housing 10 is a control box 12 having a cover 14 shown in closed position. On the inner end of the housing 10 is a sight glass retainer 16 and the inner end is sealably closed by a sight glass 18. It is through this sight glass that the operator can visually determine the level of fluid and compare that with the operation of the control mechanism within box 12 as will be set forth in more detail by reference to FIGS. 2 and 3.

Figure 3:
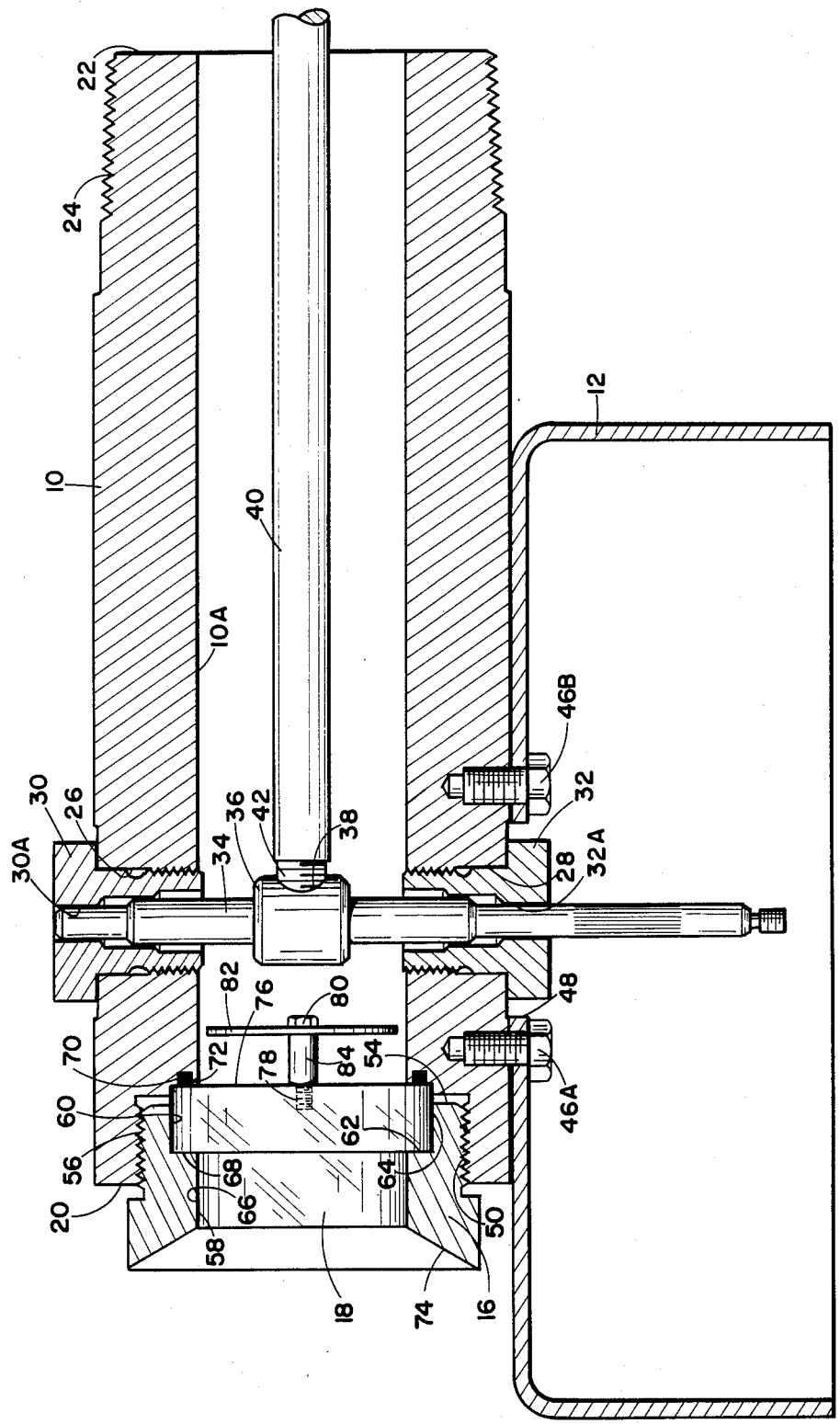
FIG. 3 is an enlarged cross-sectional view of the device in which the control mechanism is not illustrated but showing the manner in which the invention functions to provide visual verification of the level of control.

As best shown in the cross-sectional view of FIG. 3, the housing 10 is tubular having an inward end 20 and an outer end 22. The outer end portion is threaded at 24 to facilitate attachment of the housing 10 to a vessel (not shown) and more particularly, to an opening in a vessel.

Figure 2:
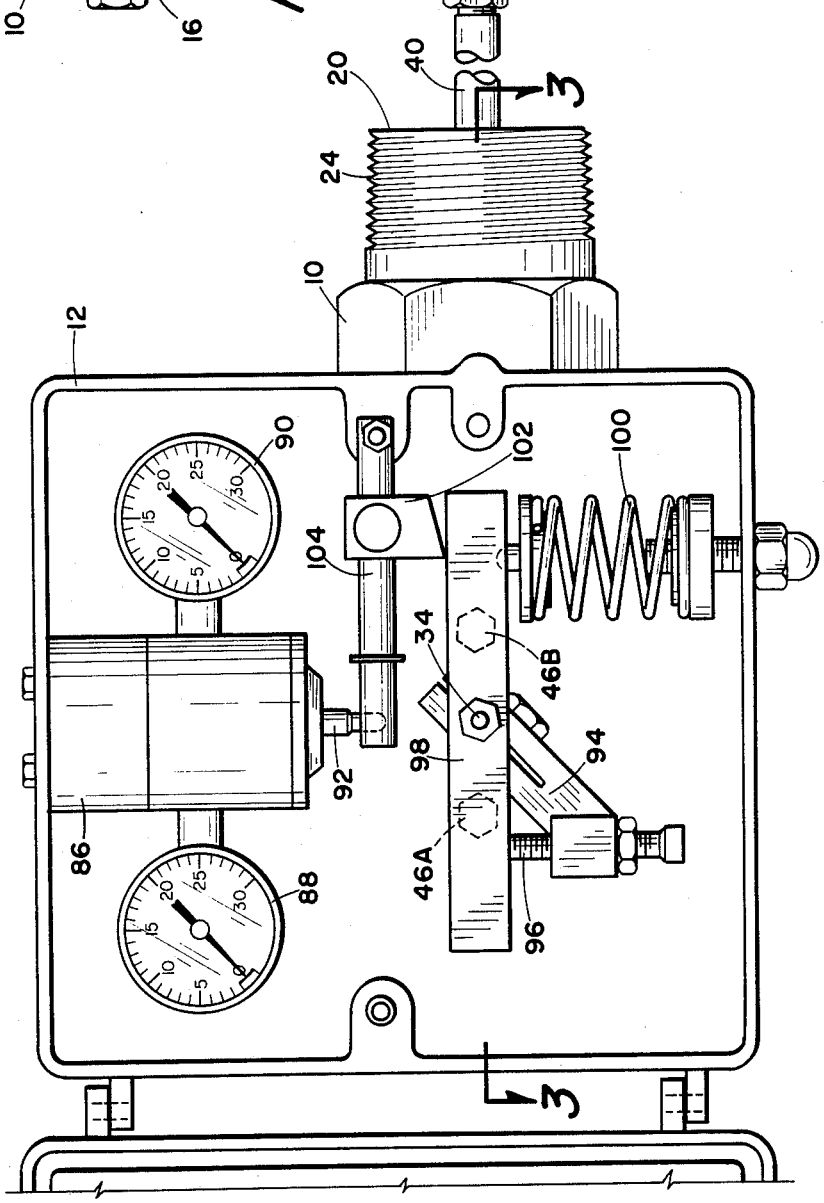
FIG. 2 is a side elevational view showing the control box with the cover opened to illustrate one embodiment of the invention in which a pneumatic signal is provided in response to a change in the liquid level in a vessel.

Formed in the housing tubular wall are opposed openings 26 and 28 which are co-axial, the co-axis being perpendicular the housing tubular axis. Received in the openings 26 and 28, which are at least in part internally threaded, are bushings 30 and 32 which are, at least in part, externally threaded. Each of the bushings 30 and 32 has an axial opening 30A and 32A respectively. Rotatably supported in openings 30A and 32A is a pivot shaft 34. The external diameter of the pivot shaft varies and the intermediate portion is of enlarged external diameter at 36 having a threaded opening 38. A float arm 40 has its inner end 42 threaded to engage opening 38. The other end of the arm 40 receives a float 44 as shown in FIG. 2.

Returning to FIG. 3, the pivot shaft 34 has a portion thereof which extends past bushing 32. The control box 12 is affixed to housing 10 by means of bolts 46A and 46B extending into threaded openings in the sidewall of housing 10. The control box has an opening 48 which receives a bushing 32 and which receives, within the control box, an integral extension of the pivot shaft. As will be described in more detail subsequently with respect to FIG. 2, a control mechanism is mounted within box 12 which responds to the rotation of shaft 34 which in turn, responds to the rise and fall of liquid level within the vessel to which the device is attached.

The inner end portion of body 10 is internally threaded at 50 and receives a tubular sight glass retainer 16 which has, adjacent its inner end 54 external threads 56. The internal diameter of the tubular sight glass retainer 52 has an inner smaller diameter portion 58 and an outward end enlarged internal portion 60 providing a circumferential ledge 62. The sight glass retainer functions to retain the sight glass 18. To conform to the shape of the sight glass retainer, the sight glass has an external cylindrical surface 64 substantially equal to and slightly smaller than the internal diameter surface 60 of the retainer.

Formed in the body is a circumferential groove 70 receiving an O-ring 72 to insure leakproof closure of the outer end of the tubular body by the sight glass.

The sight glass retainer has an inner end 74 which is frusto-conical and tapers inwardly. The frusto-conical extension of the sight glass retainer forms a light shield for the sight glass.

The inner surface 76 of the sight glass has a threaded opening 78 formed in it, the opening being co-axial with the sight glass. Received in opening 78 is a bolt 80 supporting a thin reflector plate 82 having an external diameter less than the internal diameter 10A of the body. A tubular spacer 84 positions the reflector plate from the sight glass internal surface 76 and spaces the reflector plate the proper distance from the sight glass to enable the operator to more accurately determine the level of fluid within the vessel.

FIG. 2 shows details of an exemplary pneumatic control system. A snap actor pilot valve 86 is supplied with air pressure and has extending from it a pneumatic control line (not shown). Guages 88 and 90 indicate the supply pressure and the signal pressure. A plunger 92 extending from the valve 86 causes a change in the signal pressure when it is upwardly positioned.

Affixed to pivot shaft 34 within the control box 12 is an arm 94 which by means of an adjustment screw 96 pivots a torque bar 98 which is freely rotatably received on shaft 34. Spring 100 urges the torque bar right hand end upwardly, the spring serving to counteract and in part balance the float arm 40 and float 44. When the float 44 is moved upwardly by rising liquid level, adjusting bar 94 is pivoted counter clockwise allowing spring 100 to also pivot the torque bar 98 counterclockwise which by engagement with fulcrum 102 pivots a flapper bar 104 upwardly to displace plunger 92, actuating the pneumatic signal control. When the level in the vessel falls float 44 moves downwardly, pivoting the level adjustment bar 94 clockwise and the torque bar clockwise against the compression spring 100, allowing the plunger 92 to be downwardly extended to cause an opposite pneumatic signal change.

As previously indicated, the control mechanism is not a part of the invention and has been described only to illustrate the operation of the invention. The control mechanism could be any other type of pneumatic control or it may be an electrical or hydraulic control system.

With the present invention the operator can more accurately calibrate the device. As an example, if the operator desires for a signal actuation to take place as the fluid level rises so that the level is in a plane of the tubular axis of housing 10, the operator can verify this level by observation through sight glass 18. When this level is reached the operator can rotate the adjustment screw 96 in either direction as required to provide the desired signal actuation. Without sight glass 18 the operator cannot be sure of exactly what level the signal actuation is accomplished. This visual verification not only enables the operator to more precisely adjust the control but gives the operator the psychological assurance of the proper functioning of the control device.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A liquid level control responsive to the level of liquid in a vessel, comprising:

a tubular body having a tubular axis and having a forward end and a rearward end and including means at the rearward end for attachment to an opening in said vessel, the tubular body having aligned openings on diametrically opposite sides thereof adjacent to and spaced from the forward end, the axis of each opening being perpendicular to the tubular axis of said body and intersecting therewith at one location;

a control has mounted on one side of said body, the control box having an opening therein coincident with one of said body openings;

a pivot shaft sealably and rotatably mounted in said aligned openings in said body, one end of said pivot shaft extending within said control box;

an arm having a first and second end and having said first end attached to said pivot shaft within said tubular body and extending transverse said pivot arm, said first end being attached adjacent said one location, said second end of said arm extending past said body rearward end to extend within said vessel to which the tubular body is attached;

a float secured to said second end of said arm, the float being elevationally responsive to the level of liquid within said vessel to which the body is attached, elevational changes in said level of liquid within the vessel serving to rotate said pivot shaft;

control means within said control box responsive to the pivotation of said shaft to provide a control signal responsive to the fluid level within said vessel;

a single transparent sight glass having an inner and an outer surface, the sight glass sealably closing said tubular body forward end, said sight glass being spaced from and adjacent said pivot shaft and providing visual indication of said level of fluid within said vessel; and a relatively thin reflector plate secured within said tubular body to said sight glass inner surface and spaced from said inner surface by a spacer, the reflector plate being observable through said sight glass whereby the level of fluid is visually detectable, said sight glass and said reflector plate having a central axis substantially co-axial with said tubular axis.

2. A liquid level control according to claim 1 wherein said tubular body forward end is internally threaded and including:

a tubular sight glass retainer having an inner end and an outer end, the inner end being externally threaded and is threadably received in said tubular body threaded forward end, said sight glass being retained between said tubular body forward end and said sight glass retainer, and wherein the outer end of said sight glass retainer is internally inwardly tapered providing a frusto-conical inner surface extending to adjacent said sight glass and functioning as a light shield.

* * * * *